E. C. DAVIES.
PISTON GLOBE VALVE.
APPLICATION FILED FEB. 19, 1920.

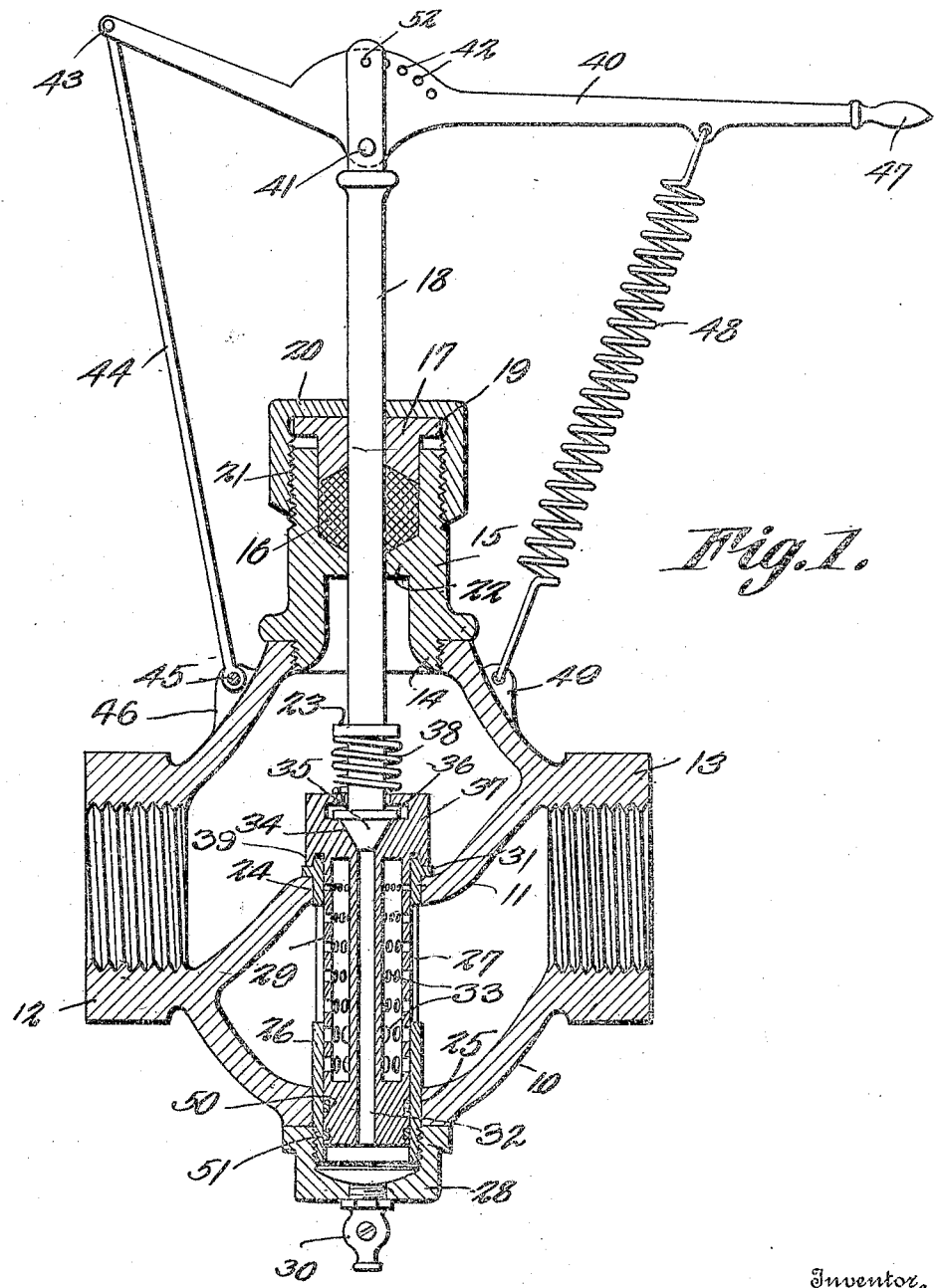

1,422,343.

Patented July 11, 1922.
2 SHEETS—SHEET 2.

Inventor
E. C. Davies
By C. A. Snow & Co.
Attorneys

UNITED STATES PATENT OFFICE.

ELMER C. DAVIES, OF PORTLAND, OREGON.

PISTON GLOBE VALVE.

1,422,343.   Specification of Letters Patent.   Patented July 11, 1922.

Application filed February 19, 1920. Serial No. 359,784.

*To all whom it may concern:*

Be it known that I, ELMER C. DAVIES, a citizen of the United States, residing at Portland, in the county of Multnomah and State of Oregon, have invented a new and useful Piston Globe Valve, of which the following is a specification.

This invention relates to new and useful improvements in valves and more particularly to improvements adapted for use in connection with globe, angle or pressure valves to be used in governing the flow of any fluid, such as liquid or gases, the object of the invention being to provide an improved valve of the balanced type, employing a piston for the purpose of facilitating the assemblage and control or regulation of the pressure of any fluid body under pressure.

A further object of the invention is to provide an improved construction for facilitating the connection of the parts and insuring against leakage, as well as facilitating cracking, while the operation of the valve can be readily controlled and adjusted, the valve being capable of being packed under pressure when wide open without the possibility of leakage.

With the above and other objects in view which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 is a vertical longitudinal sectional view of a valve constructed in accordance with the invention;

Figure 3:
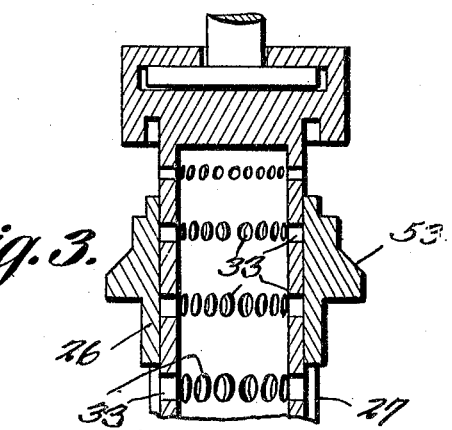
Figure 3 is an enlarged fragmentary sectional view of the upper portion of the valve, slightly unseated and showing a modified construction.

Referring to the drawings in detail, in which like reference characters designate corresponding parts throughout the several views, the valve is shown as comprising a casing or body 10 having a globular shape, and provided with a tortuous web or partition 11 extending diagonally therein from the bottom of the inlet connection or extension 12 to the top portion of the outlet connection or extension 13. These extensions are internally threaded as shown and preferably lead from diametrically opposite sides of the body or casing. The top portion is formed to receive an externally threaded extension 14 of a bonnet 15 in the form of a sleeve having a flange seating upon the upper end of the valve body or casing. This bonnet is provided with a gland 17 having packing 16 adapted to seal the straight line of escape therethrough and around the valve stem 18, the gland being provided with a flange 19 circumscribing the same. A capped nut 20 houses the flange and is provided with an internally threaded flange 21 engaging an externally threaded portion of the bonnet portion or sleeve 15. The bonnet has an internal flange 22 as shown, against which a circumscribing collar 23, preferably turned on the stem, is adapted to seat, in order that the valve may be packed under pressure when wide open, said collar sealing the packing box.

The web or partition 11 is provided with a horizontal portion having an opening 24 therethrough alining with a similar opening 25 of similar size or diameter, in the bottom portion of the casing or body. These openings snugly receive therein, a cylinder 26 in the form of a shell provided intermediate its ends with a series of spaced longitudinal parallel slots 27 constituting ports between the web or partition 11 and the bottom portion of the casing or body. The lower end of the cylinder is externally threaded for engagement by an internally threaded blind nut 28, which acts as a cylinder head therefor. The flanged top portion of the nut 28 is designed to seat tightly against the bottom face of the valve casing or body to form a leak-proof joint, and the nut is interiorly hollowed out and provided with a bottom opening internally threaded and receiving a pet cock 30 by means of which the valve may be drained.

The upper portion of the cylinder 26 is provided with a circumscribing shoulder or flange 31, the top of which forms a seat, and the lower edge of which is designed to engage the top face of the partition 11 around the opening 24. Thus when the nut 28 is tightened it will draw the cylinder or cage 26 downwardly, retaining the latter in position and binding the flange 31 on its seat. The piston 29 is provided with an axial passage or bore 32 and a series of rows of peripheral passages 33 spaced apart, and preferably extending annularly. The upper end of the bore or passage 32 is provided with a tapered machined seat 34 with which cooperates the tapered or conical valve portion 35 of the stem. This portion 35 has an outstanding boss or circumscribing flange 36 immediately thereabout, adapted to operate within the hollowed out portion of an enlargement 37 at the upper portion of the piston 29. This connection permits a slight movement of the stem 18 relative to the enlargement 37 and also serves as a coupling means between the valve stem and the piston, the valve 35 tending to unseat through the medium of the expansible helical spring 38. This spring encircles the valve stem between the boss or shoulder 23 and the top portion of the enlargement 37 and tends to unseat the valve so as to balance it. The pressure action tends to seat the valve. The enlargement 37 is formed with an annular extension 39 depending therefrom to cooperate with the top of the shoulder or flange 31, so as to close the joint at that point. The portion of the cylinder projecting above said flange 31 is designed to be normally spaced from the bottom wall of the enlargement of the piston at the head of the latter, at all times. The annular extension at the upper end of the cylinder above the seat-forming shoulder or flange 31 serves to protect the latter should the ports thus be raised an improper height, in case of a wire draw across the base of the seat on the upper end of the cylinder in which event this acts as a positive face guard. In other words the wire draw would be over the top or annular extension instead of over the seat, thereby preventing mutilation of the latter. As shown, the ports 33 in the piston are sufficient in number to insure an ample and continuous flow at all times, these ports being smaller at the top than at the bottom so as to increase the flow when the piston is raised. In order to actuate the valve stem for the purpose of raising or lowering the piston, there is pivoted in the upper end of the stem 18, a lever 40, the same being pivoted intermediately of its ends on a transverse pivot 41 preferably in the form of a bolt engaged through the bifurcated end of the stem. The lever has a segmental portion provided with a series of apertures or holes 42 arranged in an arc concentric with the pivot 41 of the lever. One end of the lever is pivotally connected as shown at 43 with a link 44 externally pivoted to the casing or body as shown at 45, said link extending upwardly above the upper end of the stem and the adjacent arm of the lever extending upwardly at an angle to meet the same. The handle end of the lever is indicated at 47 and is connected with one end of a contractile spring 48, the other end of which is connected to ears 49 at that side of the body opposite to the ears 46. The spring serves to normally hold the valve 35 closed on the seat 34 and the piston 29 pressed downwardly. At its bottom portion, the piston 29 is provided with annular grooves 50, the same being located in the peripheral walls thereof. These grooves cooperate with the lower portion of the cylinder or cage 26 below the elongated slots or oblong openings 27 and serve to receive the packing or rings 51. These grooves or rings are located near the lower end of the piston, preferably about six inches up, this depending upon the size of the valve.

As before mentioned, the annular extension at the upper end of the cylinder serves to protect the seat and prevent a wire drawing across the face of the seat should the valve not be opened as intended. When the valve is opened a pin (not shown) can be inserted in a hole at the head of the lever action, as indicated at 52, thus securing the lever in an adjusted position against the action of the spring 48 and permitting the wire draw across the top of the annular extension as shown at 31 but protecting the seat formed at the upper face thereof.

Figure 2:
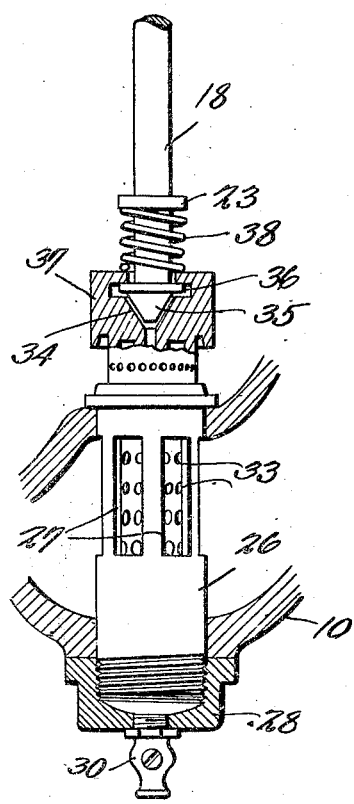
Figure 2 is a fragmentary sectional elevation, showing the valve in an unseated position.

In Figure 1 of the drawings, the valve 35 is shown in a closed position, the piston 29 being also disposed at its lowermost position so that none of the ports or openings 33 are above the upper end of the cylinder or cage 26. In Figures 2 and 3 of the drawings, the valve 35 is shown in an open position, while the upper end of the cylinder or shell is shown slightly modified to provide a beveled portion 53.

By reason of the port 32 through the end of the piston, at the axis thereof and the movable connection of the valve 35 with the piston said valve will be initially unseated against the action of the spring 48 but assisted by the spring 38, under pressure, so that the first row of openings will be raised above the top of the cylinder or shell, as shown in Figure 2 of the drawings, allowing steam or other fluid to flow into the piston and out through the oblong openings in the cylinder wall. The axial port serves as a balancing port or medium, resulting in equal pressure in opposite directions, so as to balance the position of the valve in use. Once the valve 35 is opened, it is held open by the spring 38.

In operation it is to be understood that there is absolutely no danger of the valve or seat being cut by wire draw of any fluid under pressure as the construction is such that the first row of ports in the piston will normally be one quarter of an inch or more below the seat and the first opening or hole in the head of the lever action will be so spaced from the pivot 41 as to bring the first row of ports in the piston one quarter of an inch above the seat on the top of the cylinder, the balance of the ports being likewise controlled. Therefore steam or other fluid cannot strike the valve or seat under a high velocity which is the case when a valve is cracked. Thus this valve may be held at a slightly open position by means of a pin in a hole 52 at the head of the lever without any more danger of cutting by wire drawing than if it were wide open, and the same result is attained in closing, as the steam or other fluid is cut off while the seats are nearly half an inch apart. By having the valve 35 and its seat machined or beveled as shown, the escape of fluid will be positively prevented when the valve is seated against the piston. The boss at the top of the piston which couples the stem to the piston and holds the valve stem in place will be made so as to provide sufficient play to allow the stem to be raised a trifle before the piston is raised, thereby opening the balancing valve and allowing the pressure to flow through the central port in the piston to the bottom of the same, so that the piston will be balanced and held in an upper position. The valve will be perfectly balanced under all conditions and under all cases of pressure regardless of the size of the valve, and with uniform pressure on each side of the valve, and a perfectly tight seat will be produced. In addition, the valve ports can be so regulated in size as to insure accuracy in determining how wide the valve is open. For example in a three quarter valve, the first row of ports in the piston can be made to equal in size, the area of a one-quarter inch valve opening or less; the first and second rows of ports equal in area to the opening of a three-eighths inch valve, or more or less; the first, second and third rows of ports equal to one-half inch opening and so on until the valve is wide open. The device can be applied to all regulators, valves, such as globe valves, angle valves, check valves and other controlling mechanisms for handling pressure fluids. The piston should be machined, so that it fits the bore of the cylinder or cage with precision, although a slight leak between the piston and the cylinder wall would not affect the valve, as it is to be understood that the tightness of the valve depends wholely upon the seat at the top of the cylinder and the seat at the top of the piston controlling the fluid flow through the valve, the seats being fairly protected from any cutting action by wire drawing.

Figure 4:
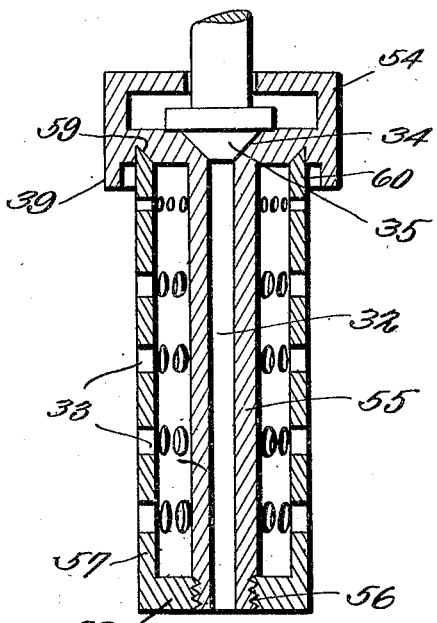
Figure 4 is a vertical sectional view of a further modified form of valve structure.

In the form of the invention shown in Figure 3 of the drawings, the piston is modified to obviate the use of the bore or passage 32 and the valve seat at the top, the valve head 35 being omitted as well as the seat 34. This construction is adapted especially for small sized valves, where a balancing is not required, possibly making the valve cheaper and lighter. In this construction, the upper face of the piston is made flat to fit the correspondingly formed lower face of the valve stem at the enlargement thereof, the connection between the valve stem and piston being made in the same manner In Figure 4 of the drawings, the piston is shown made in two sections, the enlargement 54 having a tubular portion 55 externally threaded at its lower end as shown at 56 for engagement with the internal thread of a cylindrical shell portion 57, the lower end of which is formed with a flange 58 internally threaded for this purpose. The upper end is beveled inwardly as indicated at 59 to engage a correspondingly beveled portion 60 at the bottom wall of the enlargement 54, it being understood that suitable ports or openings are provided as in the construction heretofore described. The tubular portion 55 forms the balancing port, the top of the piston the seat for the balancing valve 35, and the bottom portion of the piston forms the shell operating within the cylinder or cage as heretofore described.

Having thus described the invention, what is claimed is:—

1. In a valve, a body provided with a diagonal web having an opening therethrough, said body having an inlet and an outlet, the bottom portion of the body having an opening therein, a slotted cage mounted in said openings, said cage having means for bearing on the web above the openings, a head mounted on the lower portion of the cage to retain the latter in position and sealing the opening in the body, means for draining said head, a hollow piston having a series of ports in spaced relation graduating in size toward its lower end mounted in said cage and adapted to have vertical movement, packing means between the piston and the cage at the lower portion of the piston, said piston being provided with an enlargement at its upper end having a depending flange circumscribing the same and spaced therefrom, said cage being formed with a seat for engagement by said flange to form a liquid-tight joint outwardly of the cage, a bonnet on the upper end of the body, a stem movably mounted therethrough and connected to said enlargement, means for normally holding said stem in its lowermost position, means for holding said stem in an adjusted position when the valve is open, said stem having an enlargement, a spring on the stem between the enlargement on the stem and the enlargement on the piston tending to normally move the stem upwardly, said stem having a flange near its lower end and a valve head therebeneath, said piston having an axial bore opening through its lower end and formed with a counter bored seat co-operated with said head, said enlargement of the piston having a recess receiving the flange and stem movably therein, said spring on the stem normally unseating said valve head, and means for draining the valve beneath the piston.

2. The combination with a valve body having a partition provided with an aperture; of a slotted shell mounted in said aperture, said shell having an outward extension forming an upwardly facing seat, a hollow piston provided with a series of ports, said piston being movably mounted in said shell, an enlargement at the upper end of the piston provided with a circumscribing downward extension for engaging said seat, a stem having connection with said enlargement and operable through the top portion of the body, means for normally holding said stem in its lowermost position together with said piston, a packing gland in the top portion of the body and through which the stem is operable, said piston having a seat at the upper end thereof for the end of the stem, the lower end of the stem being formed with an enlargement movably connected to the piston, said piston having an enclosed recess receiving said enlargement of the stem, said stem having a second enlargement above the enlargement of the piston, an expansible spring between the enlargement of the piston and the last named enlargement of the stem tending to unseat the lower end of the latter, the lower end of the shell extending through the bottom of the body and receiving the piston therein, a nut threaded on the lower end of the shell and drawing the same against the partition, and a drain for the shell.

3. The combination with a valve casing having an inlet extension and an outlet extension and provided with a diagonal partition having an opening therein, the body of the valve having an opening in the bottom, a packing at the top of the body, a stem operating through said top portion at the packing, means for actuating said stem and including means for normally holding the same in its lowermost position, a shell mounted in the openings of the partition and bottom portion of the body and provided with slots intermediate of its end, the upper portion having a circumscribing shoulder adapted to seat against the top of the partition and an extension above the same, the lower portion of the shell extending through the opening at the bottom of the body, means engaging the lower portion of the shell to seal said opening of the bottom portion and retain its shell in position, a hollow piston movably mounted in the shell, an enlargement thereon having an inset recess in the upper end thereof, the lower end of the stem being formed with an enlargement movably engaging in said recess and coupling the stem and piston, said piston having a series of ports graduated in size from the top to the bottom thereof and spaced apart and having packing means in the lower end thereof cooperating with the shell, and an extension on the upper end of the piston for seating upon said shoulder.

4. A valve of the class described comprising a body, a stem operating through the body, means for normally holding the stem in its lowermost position, a cylindrical shell, said body having a diagonal partition, said partition and bottom portion of the body being apertured to receive said shell therethrough, means for retaining said shell in position, said shell being formed with an outer seat, above the partition, a hollow piston mounted in the shell for vertical movement, said shell having spaced peripheral slots, an enlargement at the upper end of the piston formed with a recess and an aperture in the upper end thereof, the lower end of the stem formed with an enlargement engaging in said recess and a tapered valve head axially thereof, the piston having an axial passage communicating with said recess and a seat cooperating with said head, means tending to hold said head unseated, said piston having a plurality of circularly arranged ports spaced apart and graduating in size toward the bottom, and a flanged extension on the upper end of the piston cooperating with said seat of the shell, said stem serving to raise said piston to vary the degree of opening and said passage serving to receive fluid therethrough under pressure whereby the piston is balanced in position.

5. A valve comprising a body having an inlet and an outlet, a web extending between the inlet and outlet, a cage having longitudinal openings and seated at one end in the web and at its other end in the body, a piston slidable within the cage and having openings for communication with the openings in the cage, said piston being hollow, means at one end of the piston and cooperating with one end of the cage for normally preventing flow of fluid under pressure through the piston, said piston having a longitudinal passage extending therethrough spaced from the wall of the piston, and a yieldingly held valve normally closing said passage at one end.

6. A valve comprising a body having an inlet and an outlet, a web in the body dividing the same into inlet and outlet compartments, a cage mounted at one end in the web and at the other end in the body, said cage intersecting the outlet compartment and having elongated openings, a hollow piston slidable within the cage and communicating with the openings in said cage, means at the upper end of the piston and cooperating with the cage for normally closing communication between the interior of the piston and the inlet compartment, a valve mounted for limited movement relative to the piston and coupled to the piston, there being a longitudinal passage within the piston spaced from the wall thereof and normally closed by the valve, and means for operating said valve to shift the piston and bring the interior thereof in communication with the inlet compartment.

7. In a valve the combination with a body having an inlet and an outet and a web intersecting the body to provide an inlet chamber and an outlet chamber, of a cage having longitudinal openings and extending through the outlet chamber, means on one end portion of the cage for engaging the web, means detachably engaging the other end of the cage and bearing against the body, for binding the cage within the body, a piston slidable within the cage and having a central passage and longitudinally disposed openings out of communication with the passage but communicating with the openings of the cage, said piston being hollow, an enlargement at one end of the piston for engaging the cage to normally close communication between the interior of the piston and the inlet chamber, a valve having a limited movement within the enlargement and normally closing the passage within the piston, said valve being coupled to the enlargement, and means for operating the valve to unseat it and to shift the piston to place the openings in the piston successively in communication with the inlet chamber while other openings in the piston are in communication with the outlet chamber.

In testimony that I claim the foregoing as my own, I have hereto affixed my signature in the presence of two witnesses.

ELMER C. DAVIES.

Witnesses:
L. M. LEPPER,
EMMA L. DOWSON.